Sept. 13, 1955 R. G. DALE 2,717,806
DUAL VALVE FOR HOT OR COLD WATER AND MIXING THEREOF
Filed June 5, 1950
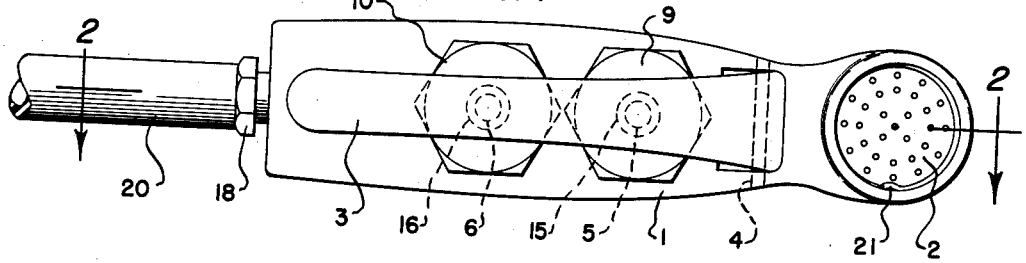
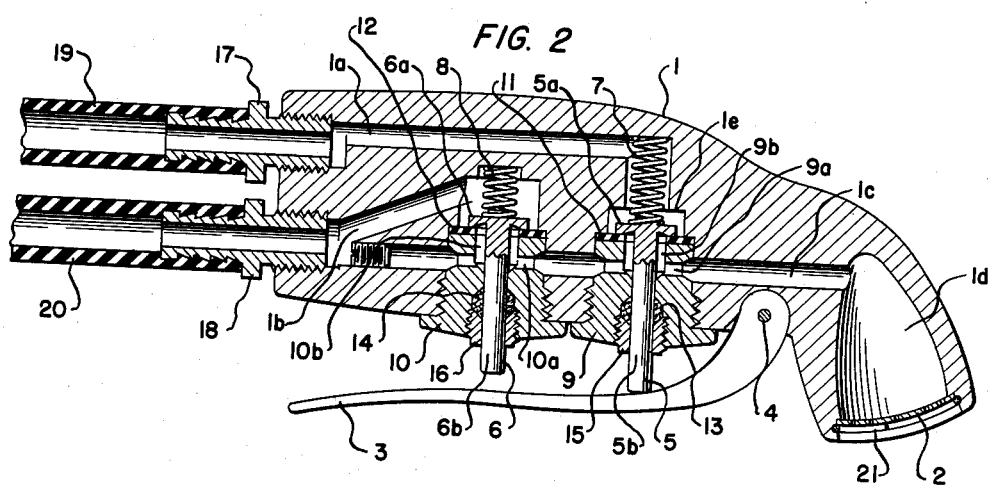
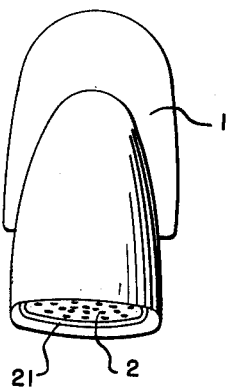
INVENTOR.
ROBERT G. DALE
BY
*Wm. H. Dean*
AGENT

United States Patent Office 2,717,806
Patented Sept. 13, 1955

2,717,806

DUAL VALVE FOR HOT OR COLD WATER AND MIXING THEREOF

Robert G. Dale, National City, Calif.

Application June 5, 1950, Serial No. 166,213

1 Claim. (Cl. 299—140)

My invention relates to a dual valve for hot or cold water and mixing thereof, and the objects of my invention are:

First, to provide a dual valve of this class which is connected to flexible conductors and which may be used for washing dishes or the like, as desired;

Second, to provide a dual valve for hot or cold water and mixing thereof which, when connected to flexible conductors, may be moved about, as desired, to various locations of a sink or the like for washing dishes, pots or pans, and which may be readily and easily caused to dispense either hot or cold water or a thermally intermediate mixture thereof, as desired;

Third, to provide a dual valve for hot and cold water and mixing thereof which provides for a very simple mode of operation, in which a single handle permits a person to dispense either hot or cold water, or a thermally intermediate mixture thereof, as desired, which leaves the other hand of a person free to handle various articles washed or upon which water is being dispensed;

Fourth, to provide a dual valve of this class having two reciprocal plungers successively engageable by a single pivoted lever, whereby one of said plungers is provided with opposed seats for successively opening and closing a water inlet with a single reciprocal movement of the lever in one direction, permitting primary opening action of one valve plunger and successive closing action thereof after the other plunger of the valve has been opened, whereby water of a certain temperature may be individually dispensed first, secondarily mixed with water of another temperature and then shut off, whereby water of said other temperature may be dispensed exclusively, providing the operator with a choice of hot or cold water, or a thermally intermediate mixture of both, employing a single manually operated lever;

Fifth, to provide a dual valve for hot or cold water and mixing thereof which is very compact and of light weight in proportion to its function; and Sixth, to provide a valve of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claim, reference being had to the accompanying drawings and to the characters of reference thereon, forming a part of this application, in which:

Fig. 1 is a bottom plan view of my dual valve for hot and cold water and mixing thereof, showing the water conductors in connection therewith fragmentarily; Fig. 2 is a fragmentary sectional view, taken from the line 2—2 of Fig. 1; and Fig. 3 is a view of the dispensing end of my dual valve for hot and cold water and mixing thereof.

Similar characters of reference refer to similar parts and portions throughout the several views of the drawings.

The casing 1, spray screen 2, valve handle 3, pin 4, valve plungers 5 and 6, valve springs 7 and 8, valve guides 9 and 10, valve seats 11 and 12, packing 13 and 14, packing nuts 15 and 16, conductor connectors 17 and 18, conductors 19 and 20, and the snap ring 21, constitute the principal parts and portions of my dual valve for hot and cold water and mixing thereof.

As shown in Fig. 2 of the drawings, I have provided a unitary casing 1, having separate water inlet passages 1a and 1b, which are adapted to conduct water of different temperatures. Within the casing 1, I have also provided a water outlet passage 1c, which communicates with both of said inlet passages 1a and 1b through separate valves, as will be hereinafter described. The outlet passage 1c communicates with an enlarged dispensing chamber 1d, having a dispensing screen 2 at the open end thereof, held in place by a conventional snap ring 21. The screen 2 is a perforate screen adapted to emit the water in a spray condition.

Communicating with the passage 1a is an inlet conductor connection 17, to which is fixed a flexible conductor 19. Secured to the casing 1 and communicating with the interior of the inlet passage 1b is the conductor connector 18, to which the flexible conductor 20 is secured, all as shown best in Fig. 2 of the drawings. Communicating with the opposite end of the inlet conductor 1a from the conductor connector 17 is the poppet head portion 5a of the valve plunger 5. This poppet head portion 5a is provided with a diametrically reduced stem portion 5b, which is reciprocally mounted in the valve guide 9, which is screw-threaded in the casing 1 and provided with transverse water passage portions 9a communicating directly with the water outlet passage 1c.

On the inner end of the valve guide 9 is the valve seat 11, which is a replaceable synthetic rubber seat of compressible character. The packing nut 15 surrounds the stem 5b of the valve plunger 5, and supports the packing 13 within the valve guide 9 for preventing leakage around the stem of the valve plunger 5. The spring 7 tends to force the valve plunger 5 outwardly toward the valve handle 3, which is pivoted to the casing 1 on the pin 4. The spring 7 also tends to maintain the poppet head 5a of the valve plunger 5, in engagement with the valve seat 11.

It will be noted that the casing 1 is provided with a valve seat portion 1e opposed to the valve seat 11, and is engageable by the poppet head 5a of the valve plunger 5 when reciprocally actuated inwardly by the valve handle 3. The valve plunger 6 is similar to the valve plunger 5 and is provided with a poppet head 6a engaging the valve seat 12, which is abutted to the inner end of the valve guide 10, which is screw-threaded in the casing 1, and said poppet head 6a communicates with the water inlet 1b and is held in normally closed position by the spring 8, which forces said poppet head 6a against the valve seat 12, which is similar to the hereinbefore described valve seat 11.

This valve seat 12 is held on the inner end of the valve guide 10, which is provided with laterally disposed passage portions 10a, communicating with the outlet passage 1c through the passage portions 9a of the valve guide 9. It will be here noted that the valve guides 9 and 10 are provided with axial water passage ports 9b and 10b, communicating with the passage portions 9a and 10a for intercommunication of the inlet and outlet passages in the casing 1 around the poppet heads 5a and 6a when in open position.

The valve guide 10 is provided with packing 14 therein, retained by the nut 16, which surrounds the stem 6b of the valve plunger 6, all as shown best in Fig. 2 of the drawings.

The operation of my dual valve for hot or cold water and mixing thereof is substantially as follows:

When it is desired to dispense water of a certain temperature through the inlet passage 1a and outlet passage 1c, the valve handle 3 is pivoted on the pin 4 toward the plunger 5 which opens the poppet head 5a, permitting water to pass through the inlet passage 1a and through the port 9b and passage 9a into the outlet passage 1c and through the screen 2. Further pivotal movement of the valve handle 3 toward the valve plunger 6 causes the engagement of the handle 3 therewith, which opens the poppet head 6a of the valve plunger 6 relative to the seat 12, permitting water of a different temperature to mix with the water passing through the inlet passage 1a, said mixture taking place in the outlet passage 1c and the dispensing chamber 1d.

After both of the poppet heads 5a and 6a are opened, further pivotal movement of the lever 3 causes closure of the poppet head 5a relative to the seat 1e, shutting off passage of the water through the inlet passage 1a, causing dispensation of water from the inlet passage 1b only and outwardly through the screen 2.

Thus, initial movement of the valve handle 3 opens the valve plunger 5, continued movement causes concurrent opening of the valve plunger 6, and further movement of the valve handle 3 causes closure of the valve plunger 5a with the seat 1e, leaving the valve plunger 6 remaining in open position for dispensation of water from the inlet 1b to the outlet 1c. Thus, hot or cold water may be dispensed selectively or in certain mixed proportions for an intermediate thermal condition, as desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

A water spray unit, a unitary casing having therein a pair of water inlets, a pair of valves positioned individually in said inlets and a common nozzle integral with said casing having a water outlet communicating with said inlets and said valves, said valves having spring biased reciprocal plungers positioned therein, and extending outwardly from the casing, a handle lever pivoted on said unitary casing on an axis normal to the axes of said plungers, said lever being successively engageable with said plungers, the plunger of one of said valves having two opposed seat portions and the other of said plungers having a single seat portion, the plungers being of such relative lengths that the movement of said lever toward said plungers causes successive opening and closing of said one valve at two corresponding positions of the lever and the opening of the other valve at an intermediate position of the lever, a mixing chamber in said casing and communicating with said outlet, said casing being elongated, said mixing chamber and said inlets being at opposite ends of the casing, said lever extending substantially longitudinally of the casing, whereby the spray unit is adapted for being held in the hand and used as a mixing valve when said inlets are connected by flexible tubes with hot and cold water sources, said one valve including plunger guide screw-threaded into said casing and having a transverse passage communicating with the other valve so that mixing of fluid from both inlets is initiated in said one valve when both valves are open.

References Cited in the file of this patent

UNITED STATES PATENTS

| Number | Name | Date |
| --- | --- | --- |
| 1,163,081 | Gluckman | Dec. 7, 1915 |
| 1,213,831 | Bottum | Jan. 30, 1917 |
| 1,268,232 | Furman | June 4, 1918 |
| 1,493,031 | Glanzberg | May 6, 1924 |
| 1,558,064 | Thrift | Oct. 20, 1925 |
| 1,600,170 | Henderson | Sept. 14, 1926 |
| 1,802,324 | Bartlett | Apr. 28, 1931 |
| 1,970,039 | Fraser | Aug. 14, 1934 |
| 2,094,161 | Paddock | Sept. 28, 1937 |
| 2,197,979 | Jones | Apr. 23, 1940 |